L. L. STORY.
MECHANICAL MILKER.
APPLICATION FILED SEPT. 13, 1909.
969,761.
Patented Sept. 6, 1910.
9 SHEETS—SHEET 3.
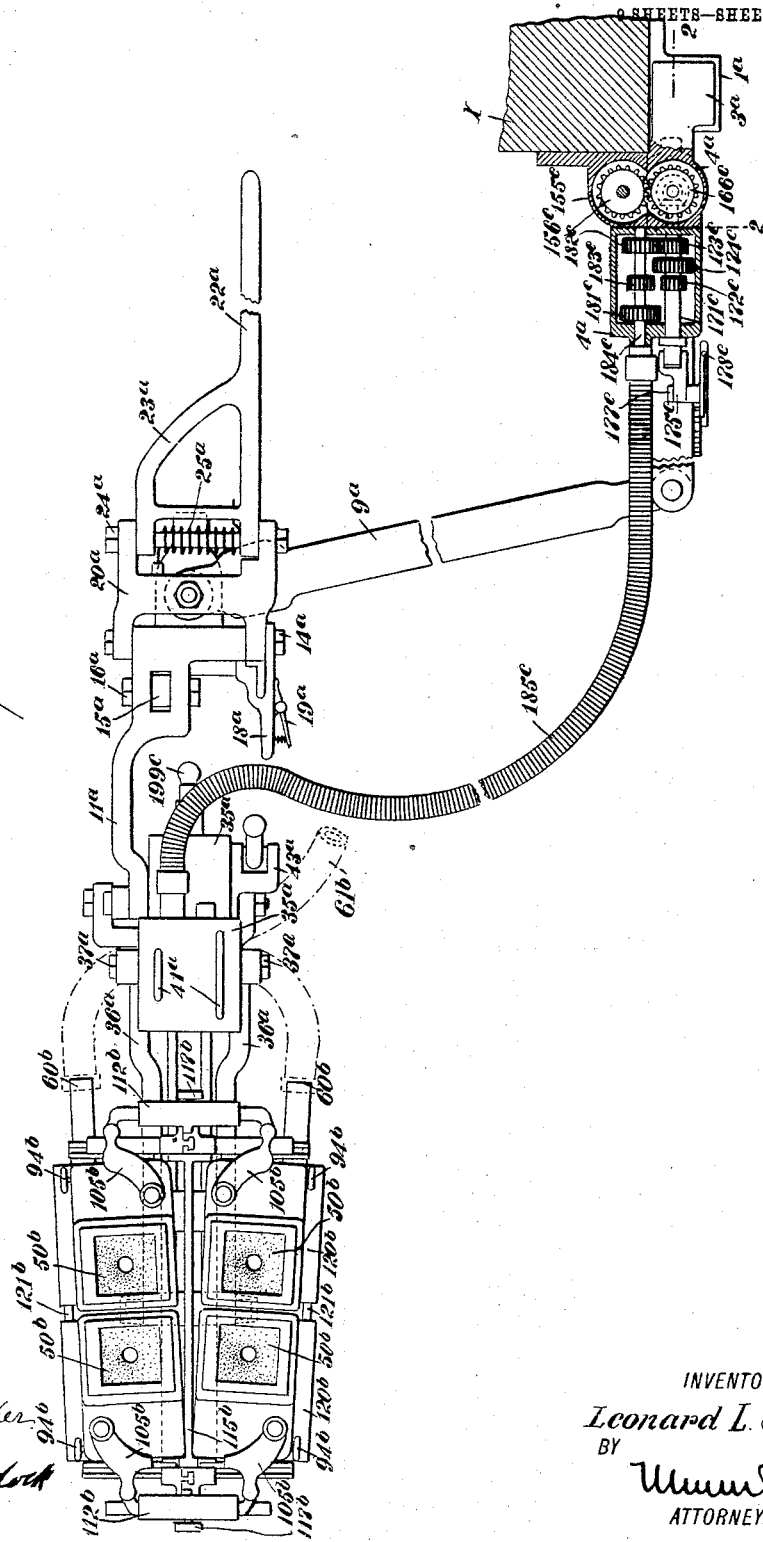
WITNESSES
H. J. Walker
C. F. Murdock
INVENTOR
Leonard L. Story
BY
ATTORNEYS

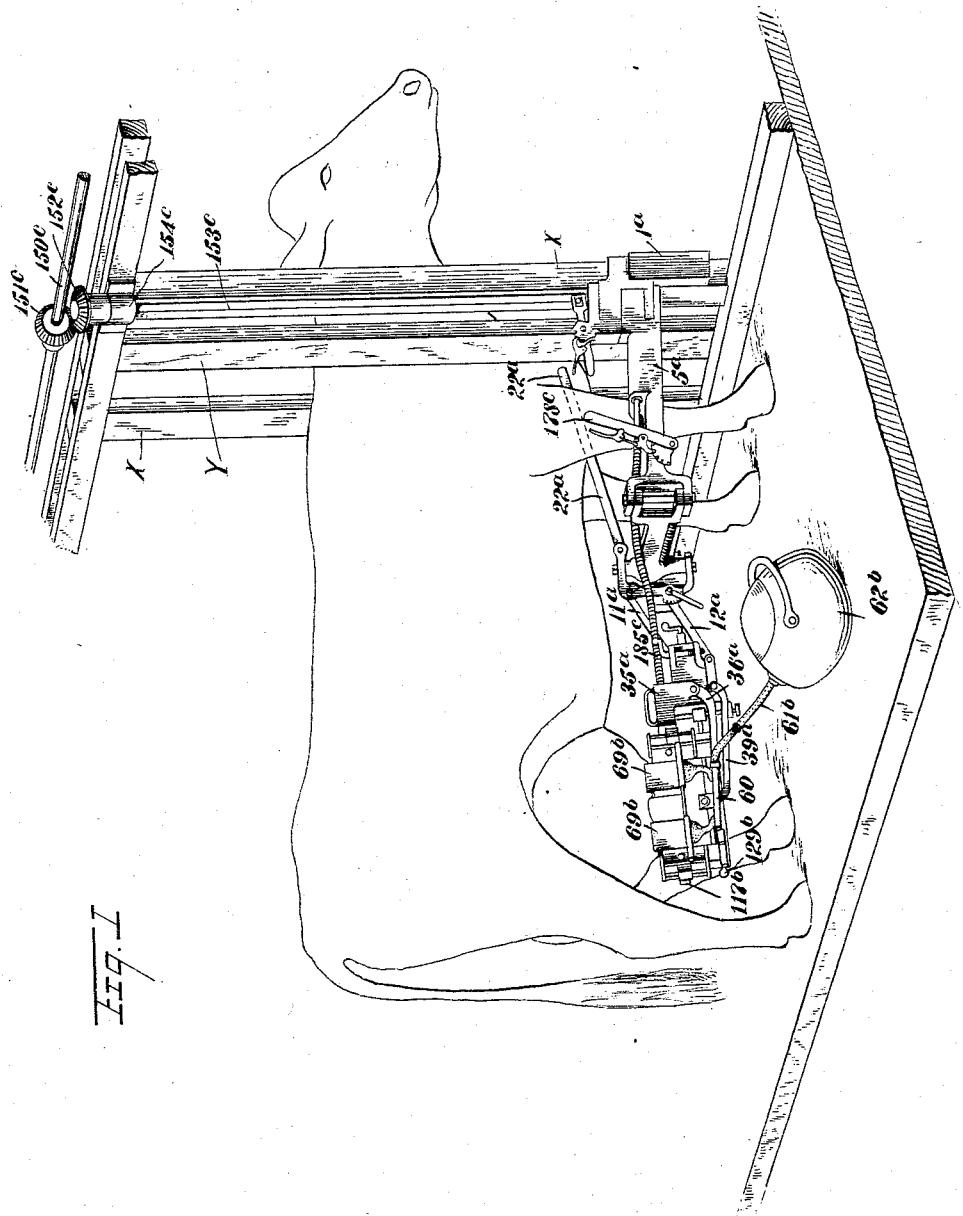

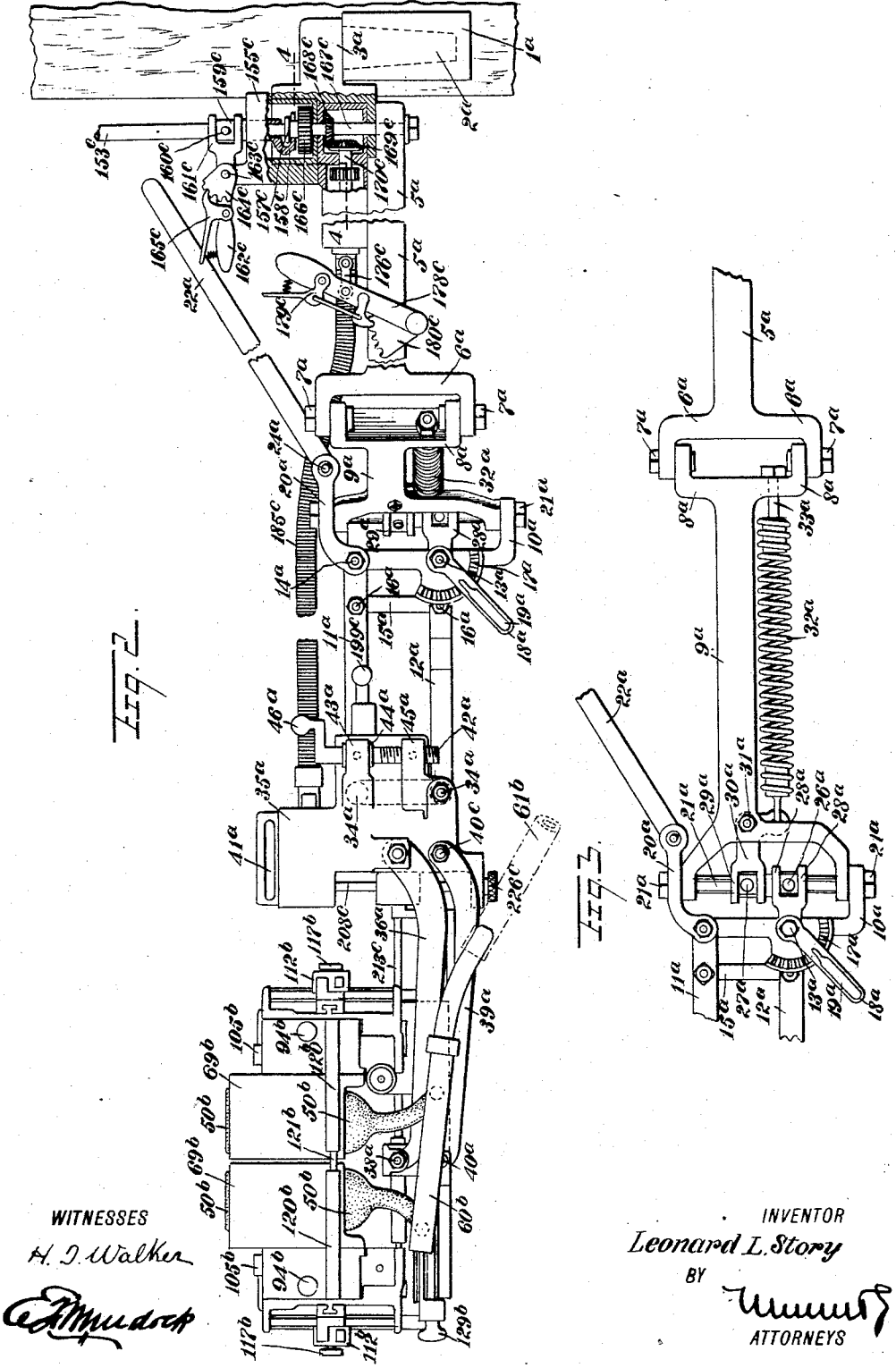

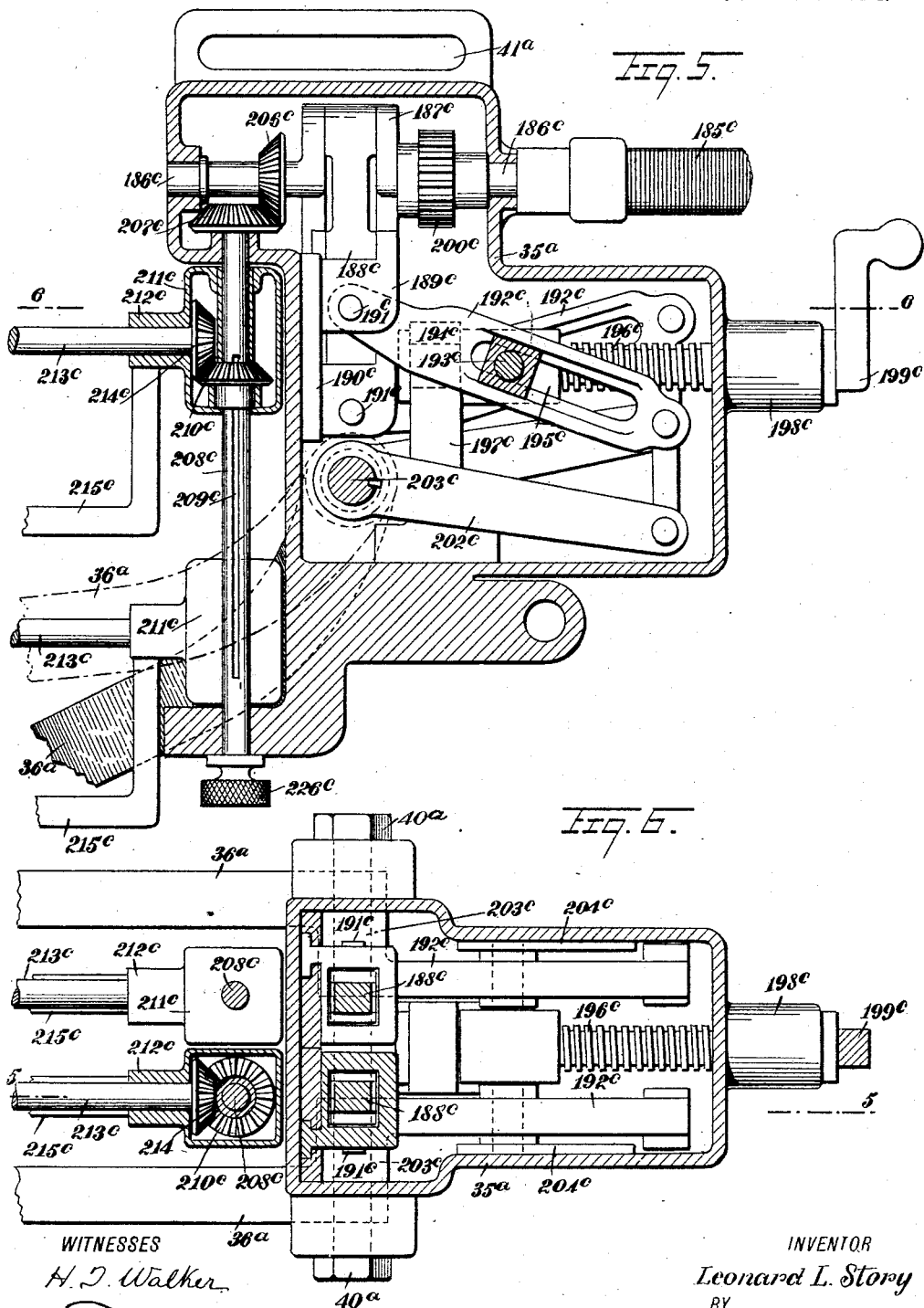

L. L. STORY.
MECHANICAL MILKER.
APPLICATION FILED SEPT. 13, 1909.
969,761.
Patented Sept. 6, 1910.
9 SHEETS—SHEET 5.
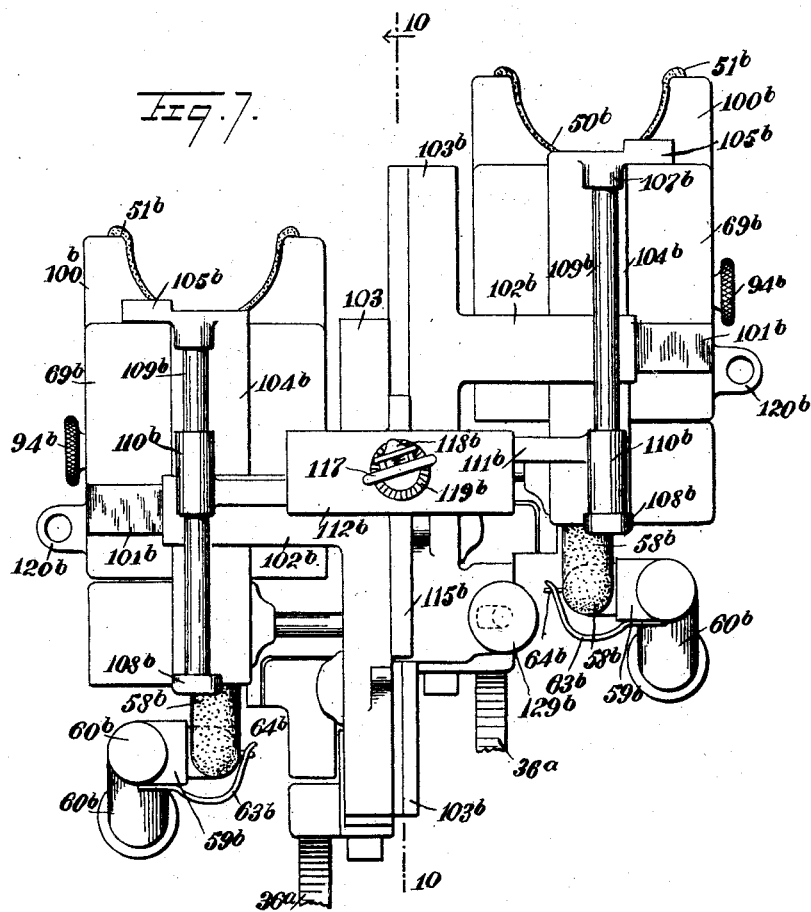
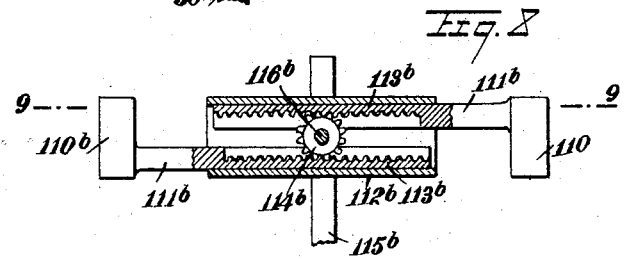
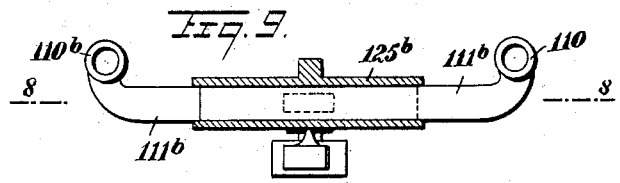
WITNESSES
H. J. Walker
INVENTOR
Leonard L. Story
BY
ATTORNEYS

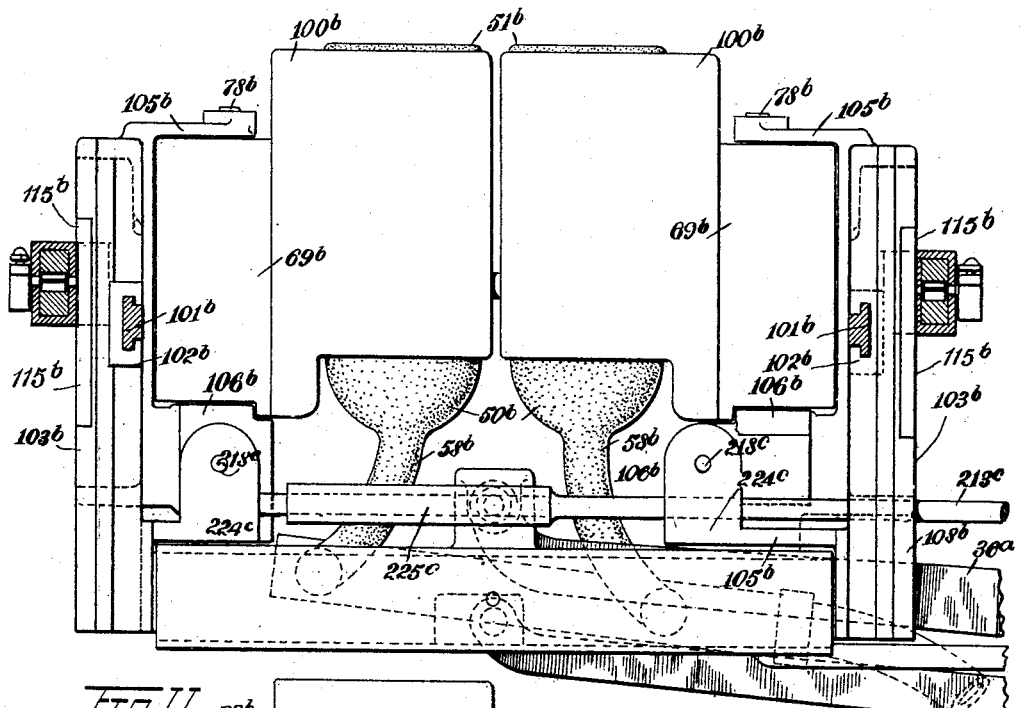
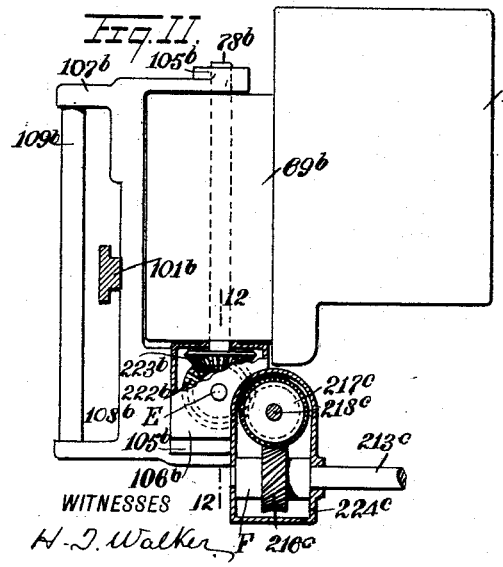
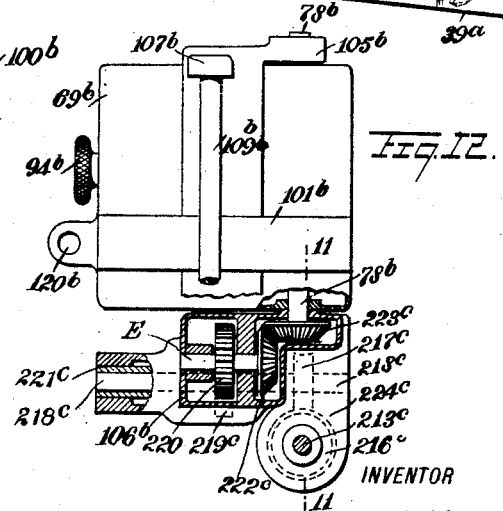

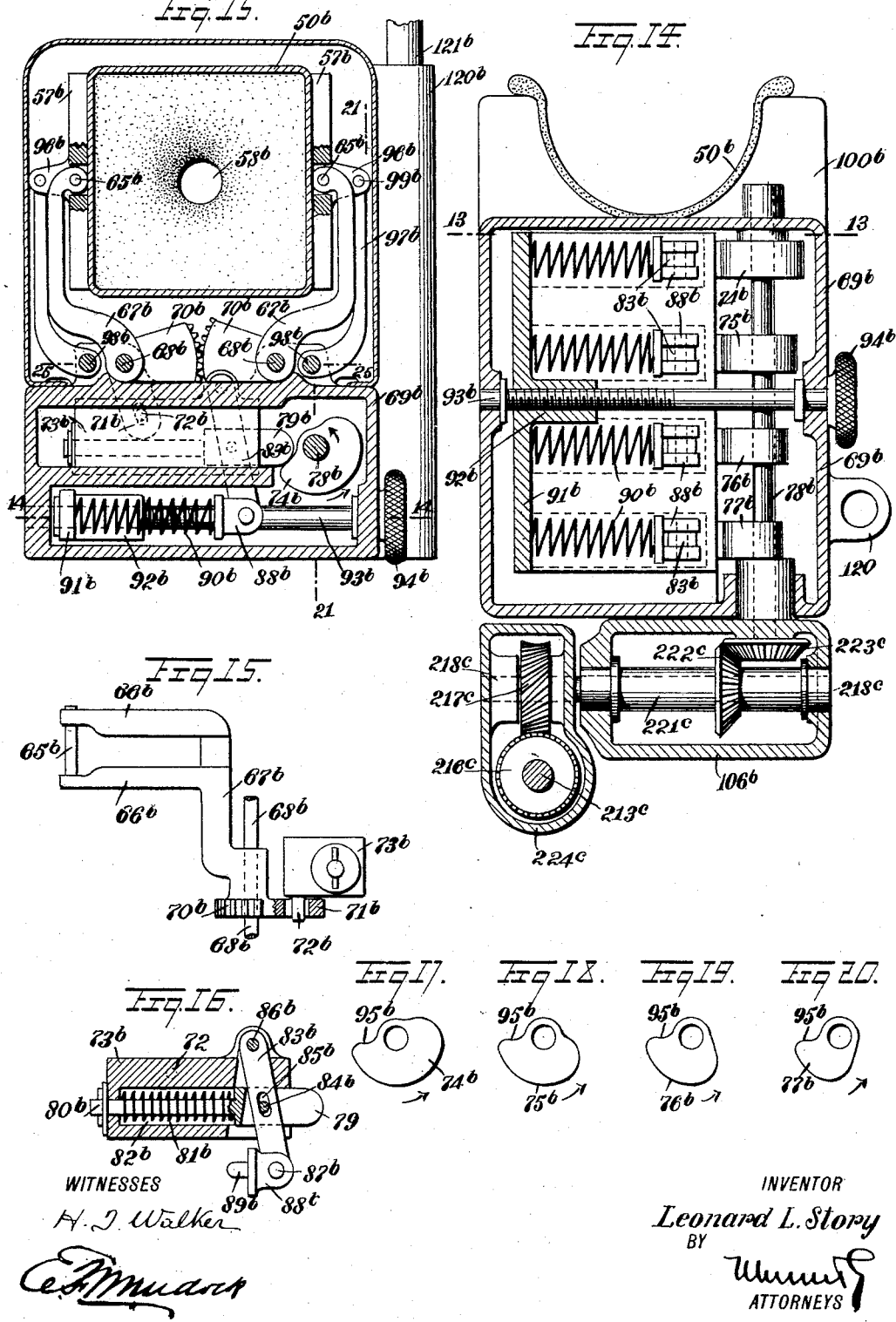

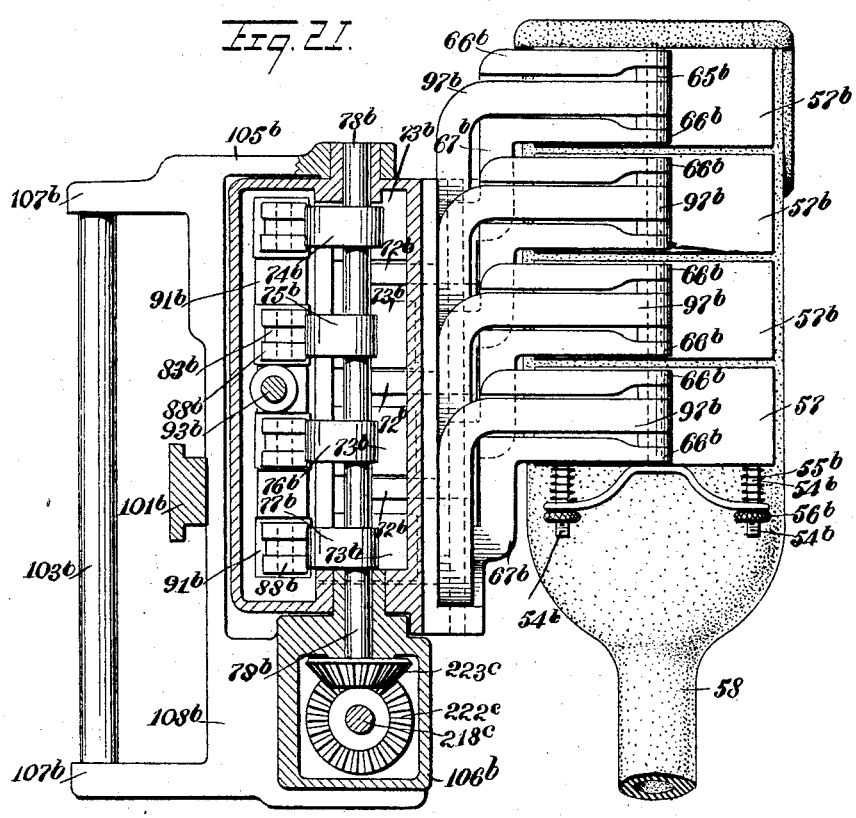
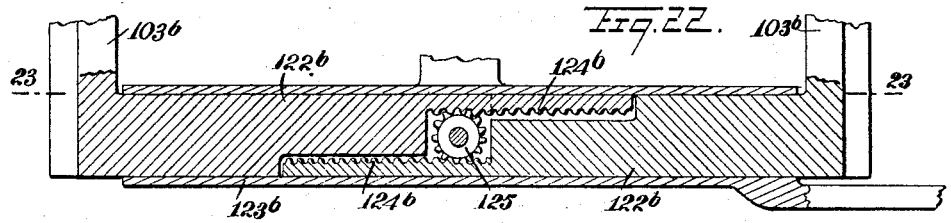
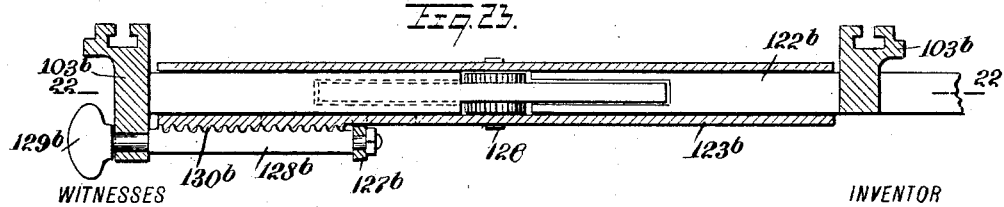

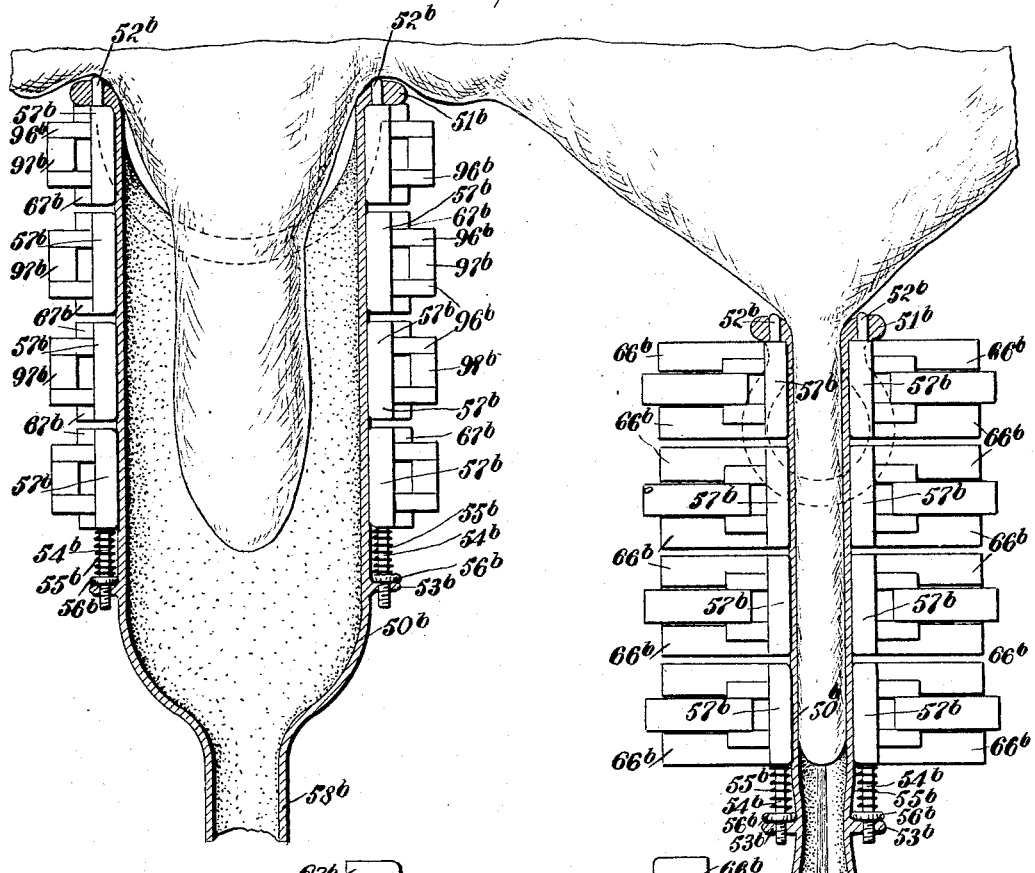

UNITED STATES PATENT OFFICE.

LEONARD LEACH STORY, OF EAST FAIRFIELD, VERMONT.

MECHANICAL MILKER.

969,761.  Specification of Letters Patent.  Patented Sept. 6, 1910.

Application filed September 13, 1909. Serial No. 517,462.

*To all whom it may concern:*

Be it known that I, LEONARD L. STORY, a citizen of the United States, and a resident of East Fairfield, in the county of Franklin and State of Vermont, have invented a new and useful Mechanical Milker, of which the following is a full, clear, and exact description.

Among the objects which the present invention has in view are: to provide a mechanical milker adapted to milk the cows separately and singly; to provide a milker wherein compression is used instead of suction or forcing; to provide means for mechanically manipulating the udder; to provide means whereby the udder may be manipulated to completely evacuate the same; to provide means for adjusting the mechanical action to prevent injury or hurt to the cow; to provide means for carrying on the operation of milking alternately upon different sides of the udder; to provide means for adjusting the mechanism to the physical irregularity of the different cows; and to provide devices for extracting the milk from the udder by progressive downward compression of the teat in simulation of the action of the human hand.

One embodiment of the present invention is illustrated in the accompanying drawings forming a part of this specification, in which like characters of reference denote corresponding parts in all the views, and in which—

Figure 1 is a fragmentary view of a cow being milked by a mechanical milker constructed in accordance with the present invention; Fig. 2 is a side elevation of the mechanical milker constructed in accordance with the present invention. In this view the middle extension is shown in isometric perspective and the casing of the driving gear is removed to show in section taken on the line 2—2 in Fig. 4; Fig. 3 is a side elevation of the middle extension above mentioned; Fig. 4 is a plan view of the construction in position as shown in elevation in Fig. 2. The casing for the driving gear is removed to show in section taken on the line 4—4 in Fig. 2; Fig. 5 is a detail view in vertical section, taken on the line 5—5 in Fig. 6, of the gear casing of the reciprocating and driving mechanism for the milker; Fig. 6 is a detail view in horizontal section, taken on the line 6—6 in Fig. 5, of the mechanism shown in Fig. 5; Fig. 7 is an end elevation of the teat cups and operating mechanism connected therewith; Fig. 8 is a detail view in side elevation, being partly cut away in section taken on the line 8—8 in Fig. 9, of the spreading guide arms used in connection with the teat cups; Fig. 9 is a plan view of the construction illustrated in Fig. 7 in horizontal section, taken on the line 9—9 in Fig. 8; Fig. 10 is a side elevation, partly in section, taken on the line 10—10 in Fig. 7, of the teat cups on one side of the milking mechanism; Fig. 11 shows the operating mechanism connected with one of the forward teat cups or those next adjacent to the gear case $35^a$; Fig. 12 is an end view in elevation, partly in section, taken on the line 12—12 in Fig. 11, of the mechanism illustrated in Fig. 11; Fig. 13 is a plan view, partly in section, taken on the line 13—13 in Fig. 14, of a single teat cup; Fig. 14 is an end elevation, partly in section taken on the line 14—14 in Fig. 13, of the construction shown in Fig. 13; Fig. 15 is a detail view in side elevation of one of the compressing arms used in this construction; Fig. 16 is a detail view in horizontal section of the construction and arrangement of the driving link employed in the present construction; Figs. 17, 18, 19 and 20 are plotted views of the cams for operating the teat compression members, reading from the top down, respectively; Fig. 21 is a side elevation partly in section taken on the line 21—21 in Fig. 13, of the teat cup and operating mechanism therefor; Fig. 22 is a detail view in plan taken on the line 22—22 in Fig. 23, showing the mechanism for adjusting the teat cups longitudinally; Fig. 23 is a detail view in elevation, taken on the line 23—23 in Fig. 22; Fig. 24 is a diametric view exaggerated, showing the operative positions of the milking mechanisms at the end of the operation of one and beginning of the operation of the other; and Fig. 25 is a vertical section of the compressing mechanism taken on the line 25—25 in Fig. 13.

The present device may be more conveniently described when divided into groups of instrumentalities for operating to perform distinct and separate functions. These groups I will describe, beginning first with the supporting structure whereby the milking device is held in operative position relative to the cow and the building structure; the second group arranges itself from the various instrumentalities which immediately co-act to extract the milk from the udder; and the third group are the instrumentalities composing the power transmission. To the individual members of these groups for convenience of distinguishing the same I have applied the common group designating letter, while for the purpose of distinguishing the individual devices and parts of each group I have used designating numerals.

The supporting structure is removably mounted in a block $1^a$, which is securely mounted upon a stationary stanchion X of the building structure. Within the block $1^a$ is a tapered socket provided to receive a tapered supporting pin $2^a$. The pin $2^a$ is extended from a head $3^a$, extending from which is a casing $4^a$. The casing $4^a$ is hingedly connected with a bracket arm $5^a$, which is provided at the outer end with a yoke $6^a$. The bracket arm $5^a$ is connected with the casing $4^a$ and head $3^a$ ($4^a$ and $3^a$ are in one piece) by means of a hinge joint with the shaft $167^c$ as an axis, so that the bracket arm $5^a$ can swing to the right or left when a cow varies her position, the miter gears $168^c$ and $169^c$ permitting this movement. The yoke is vertically extended, as shown particularly in Fig. 2 of the drawings, and is easily secured by means of bolts $7^a$ to a yoke $8^a$ mounted upon an extension arm $9^a$. The arm $9^a$ is likewise secured to a yoke $10^a$, to which parallel arms $11^a$ and $12^a$ are secured. The arms $11^a$ and $12^a$ are pivoted to the yoke $10^a$ at $13^a$ and $14^a$ respectively. The said arms are held in parallel arrangement by a link $15^a$, which is pivotally mounted at $16^a$—$16^a$ upon both arms. The arms $11^a$ and $12^a$ so provided with the mechanism attached to them at the outer end, may be elevated or depressed. For this purpose the yoke $10^a$ is provided with a quadrant $17^a$, having on the surface thereof suitable gear teeth radially disposed about the pivot $13^a$ on which the arms $12^a$ embrace. Fixedly attached to the bolt constituting the pivot $13^a$ is a hand lever $18^a$, upon which is mounted a spring-actuated detent $19^a$, the teeth of which pass through the lever $18^a$ and engage the teeth of the quadrant $17^a$. The hand lever $18^a$ serves the purpose of an adjustable stop to prevent the arms $12^a$ and $11^a$ from being raised beyond a desired point by the spring $32^a$, as there is a projection on the arm $12^a$ which will strike against a projection on the lever $18^a$ when the latter is set at any one of the spaces in the quadrant $17^a$. The lever $18^a$ is normally intended to be raised up out of the way in the topmost space so that the arms $12^a$ and $11^a$ will swing freely up and down, being counterbalanced by the spring $32^a$, so that they will normally be in a raised position. At the upper extension of the yoke $10^a$ is a link plate $20^a$. It is between the plate $20^a$ and the lower extension of the yoke $10^a$ that the pivot bolt $21^a$ extends, and it is through the arms of the plate $20^a$ that the pivot $14^a$ is extended. This construction is provided to hold a rod $22^a$. Structurally, the rod $22^a$ is extended from an arc-shaped hinged member $23^a$, which is pivoted upon a bolt $24^a$ in the plate $20^a$. About the bolt $24^a$ is a coiled spring $25^a$, which is so arranged as to lift upward the rod $22^a$.

When the apparatus being described is in operative position the rod $22^a$ is inserted between the fore-legs of the cow, and the spring $25^a$ lifts the said rod between the near fore-leg and the brisket of the animal. By this arrangement there is formed a holding member for maintaining the milking mechanism in guided position on the animal, and such construction and arrangement is herein called the holding member. The arc-like member being extended, as shown in Fig. 4 of the drawings, serves to maintain the horizontal arrangement of the rod and its connections relative to the arm $9^a$, which is easily drawn into position, substantially that shown in Fig. 4 of the drawings, extended at an angle to the line of the operative position of the milking apparatus. The rod $22^a$ being held constantly in engagement with the animal and between the brisket and leg thereof, the milking apparatus is held in line parallel with the extension and the animal's body.

The arm $12^a$ is extended beneath the pivot $13^a$ to engage a sleeve slidably mounted upon the bolt $21^a$ and carrying small trunnion extensions $26^a$. Mounted upon the said sleeve is a revolving block carrying trunnions $27^a$. The said sleeve and block are rotatably connected. The trunnions $26^a$ are engaged by yoke extensions $28^a$ of the arm $12^a$, while the trunnions $27^a$ are engaged by yoke extensions $29^a$ formed on the bell crank lever $30^a$, which is pivotally mounted at $31^a$ upon the arm $9^a$. To the free end of the bell crank lever $30^a$ is attached a heavy spiral expansion spring $32^a$, which is anchored to the yoke $8^a$ by the bolt $33^a$.

The milking apparatus is held in position on the cow as follows: Two of the teat cups are gripping or compressing the teats when the other two have released the teats and vice versa, so that there are always two teat cups hanging on or gripping the teats. The rod $22^a$ extends between the cow's fore-leg and brisket. If the cow should move sidewise while confined in the stanchions, she will pull the machine along with her because of the two teat cups which are compressing two of the teats. With her neck in the stanchion, the cow must necessarily move her hind quarters to a greater extent than her forward quarters in moving sidewise. The point at which the rod $22^a$ passes between the cow's fore-leg and brisket serves as a fulcrum, so that when the cow pulls the machine to one side by means of her teats, the machine and rod 22$^a$ serve as a lever with the fore-leg and brisket as a fulcrum, and thereby draw along the supporting frame or bracket 9$^a$ and 5$^a$, the three hinge joints, with respective axes at 21$^a$, 7$^a$ and 167$^c$ permitting the movement. If the arm 22$^a$ were not employed, the teat cups would be twisted off the teats when the cow stepped sidewise, unless the surcingle was used.

At the outer end the arms 11$^a$ and 12$^a$ are pivotally connected by a frame 34$^a$, 45$^a$ to a gear case 35$^a$. By reason of the mounting of the gear case 35$^a$ upon the arms 11$^a$ and 12$^a$, which are held to move at all times parallel, the said gear case is maintained in a vertical position in all positions to which it is raised and lowered. It is from the gear case 35$^a$ that the supporting levers 36$^a$—36$^a$ are extended, upon the outer end of which are mounted supporting frames for the teat cups. The levers 36$^a$ are pivotally mounted on bolts 37$^a$—37$^a$, set out from the side of the casing 35$^a$, and are pivotally connected at 38$^a$, 38$^a$ to the supporting frame of the teat cups.

Extended between the supporting frame for the teat cups and the gear casing 35$^a$ are link arms 39$^a$, provided to maintain the parallel arrangement of the teat cups and the gear casing 35$^a$. The arms 39$^a$ are pivotally mounted at 40$^a$—40$^a$ to the said casing and supporting frame for the teat cups.

The gear casing 35$^a$ is provided at the top with loops 41$^a$—41$^a$, through which the ends of a surcingle are passed whenever it appears that the rod 22$^a$ and teat cups are not sufficient to maintain the apparatus in operative position upon the animal, as in the event of a restive animal. When the surcingle is used, it is secured to one of the loops 41$^a$ and thrown over the small of the back of the animal and connected to the other of the said loops, strapping the apparatus firmly in position upon the animal.

Thus far I have described the supporting structure, which is removably attached to the building structure or milking rack, and which is adjustable lengthwise, crosswise and in elevation. It is upon this that the operating mechanism and power transmission mechanism are mounted and supported.

In dairies where an apparatus of the character specified is used there are provided milking floors and racks. The racks consist of stationary members such as that indicated by the letter X in Fig. 1 of the drawings, and movable members such as indicated by the letter Y in the same figure of the drawings. Between the open stanchions the cow can easily extend her head, but when the movable stanchion Y is placed in position the head cannot be withdrawn. It is in this position that the milking apparatus is applied.

The milking apparatus consists primarily in the four teat cups 50$^b$. These cups are constructed preferably from flexible waterproof material. They are substantially square in cross section and the upper edge is shaped somewhat as the mouth of a fish. To the upper edge is formed a heavy lip 51$^b$ having perforations therein to receive pins 52$^b$. The lip 51$^b$ is depressed or cut away in the longitudinal line of the milking apparatus. The inner wall of each two of all the cups mounted in horizontal arrangement is raised to strike between the teats of the udder. In the physical construction of the udder there is a single crease between the teats into which it is desirable that the side of the cups should extend, it being the object of the present invention to employ within the operative engagement as much of the udder as is practicable, as will be seen by glancing at Fig. 24 of the drawings.

From the walls of the cup near the lower end thereof are extended ears or tabs 53$^b$, which are perforated to receive rods 54$^b$—54$^b$ about which are mounted spiral springs 55$^b$. The spiral springs 55$^b$ expand against washers 56$^b$—56$^b$, against which the ears 53$^b$ bear from beneath. It is by the expansion of the springs 55$^b$ that the body of the cups 50$^b$ is held firmly erect. The rods 54$^b$ are mounted in plates 57$^b$—57$^b$. At the lower end the cups 50$^b$ are compressed and form pipes 58$^b$. The pipes 58$^b$ are provided with a suitable connection whereby they are extended in unions 59$^b$ 59$^b$ which are connected with conduits 60$^b$—60$^b$. The conduits are united by a suitable union or connection to a suitable pipe 61$^b$ whereby the milk is carried to a receptacle 62$^b$. The union 59$^b$ is held in engagement with the pipe 58$^b$ by a spring 63$^b$ which extends behind a pin 64$^b$ and secures the connection.

The milk extracting devices are similar in their operation therefor there will be described only the one.

As above mentioned, the cups 50$^b$ are held in position upon the plates 57$^b$—57$^b$ and the rods 54$^b$—54$^b$. The plates 57$^b$—57$^b$ are shown as being four in number. This number may be varied to increase or decrease the number of plates. The plates are square faced, elongated, straight members and are pivotally mounted on pins 65$^b$—65$^b$ which are extended between the arms 66$^b$—66$^b$ of compression levers 67$^b$ 67$^b$, which are shaped substantially as shown in Fig. 15 of the drawings, having vertical extensions to raise the extended arms 66$^b$—66$^b$ above the vertical pivotal connection of the levers with the rod 68$^b$. The rod 68$^b$ is mounted stationarily on the side of a casing 69$^b$. The levers 67$^b$ are provided at the lower end with a quadrant extension 70$^b$, which is provided with gear teeth on the periphery, which engage similar teeth on the periphery of the quadrant extended from the lever oppositely disposed. This engagement of the quadrants of the individual members of the pairs of levers $67^b$ causes a uniformity of movement of the said levers $67^b$ and plates $57^b$ connected therewith. From the side of each of the series of the quadrants farthest removed from the cam-shaft $78^b$ is extended an arm $71^b$, which enters the casing $69^b$ through a slot in the side wall thereof and is provided with an elongated slot to engage a pin $72^b$, which pin $72^b$ is dependent from the lower wall of the box $73^b$. The plates $57^b$ are projected and retracted each from the other by the box $73^b$, a reciprocating movement being imparted thereto, which causes the arm $71^b$, the quadrants $70^b$ and levers $67^b$ to rock on the rods $68^b$.

The reciprocations above mentioned are imparted to the boxes $73^b$ by the cams $74^b$, $75^b$, $76^b$ and $77^b$. These cams are fixedly mounted on a vertical shaft $78^b$ which is extended through the casing $69^b$ and rotatably mounted therein. Extended in the rotary path of each of the cams mentioned are bullet-headed pistons $79^b$, which are provided with shank-extensions $80^b$, about which is coiled a spiral spring $81^b$ in such manner as to bear against the inner wall of a socket $82^b$ with which the box $73^b$ is provided and the rear of the head of the pistons $79^b$. The normal operation of the spring is to thrust the piston $79^b$ outward from the box $73^b$. At the rear of the box the shank beam is extended through the wall of the said box and is provided with a washer and retaining pin substantially as shown in Fig. 16 of the drawings, whereby the piston is prevented from being ejected from the box. The piston $79^b$ is provided with a suitable slot to receive a flat lever $83^b$, a pin $84^b$ being set through the slot to engage an elongated slot $85^b$ formed in the said lever. The lever $83^b$ is pivotally mounted at $86^b$ in ears set out from the side of the box $73^b$, as seen most clearly in Fig. 16 of the drawings. The end of the lever $83^b$ opposite that receiving the pivot $86^b$ is pivotally connected at $87^b$ with a head $88^b$ which is provided with a shank $89^b$ to which a spiral spring $90^b$ is attached. The spiral spring $90^b$ is compressed and connected to the adjusting plate $91^b$ which extends vertically within the casing $69^b$ to receive the four or more springs $90^b$ to which the various heads $88^b$ are connected. The plate $91^b$ is provided with a box $92^b$ centrally bored, tapped and screw threaded to receive in screw threaded engagement a threaded screw $93^b$. The screw $93^b$ is rotatably mounted in the sides of the casing $69^b$ and is provided with a thumb nut $94^b$.

By means of the construction just above described, it will be observed that as the boxes $73^b$ are thrown from the shaft $78^b$ by the operation of the various cams mounted thereon, this is accomplished through the piston $79^b$ and the pin $72^b$ which is connected to the arm $71^b$ set out from the quadrants $70^b$. It will also be observed that the connection between the box $73^b$ carrying the pin $72^b$ and the piston $79^b$, is through the springs $81^b$ and $90^b$, the yielding of both of which will arrest the compression of the plates $57^b$ by the levers $67^b$.

The cams $74^b$, $75^b$, $76^b$ and $77^b$ are each set on the shaft $78^b$ so that the drop or straight walls $95^b$—$95^b$ aline. The said cams rotate in the direction shown in Figs. 17, 18, 19 and 20, whereby the rise of the cams is successive and progressive in their operation, while the drop of all the cams is simultaneous.

The operation of the mechanical features just above described is as follows: When the teat cup is adjusted to the udder and the driving mechanism started, the shaft $78^b$ is rotated, presenting in the first instance to the uppermost lever $79^b$ the rise of the cam $74^b$, which is located at the upper end of the shaft $78^b$. The rise of the cam $74^b$ throws the piston $79^b$ away from the shaft $78^b$, forcing the lever $83^b$ and the box $73^b$ through the pivotal connection $86^b$, backward. This action on the part of the box $73^b$, carries the arm $71^b$ in the direction required to rock the lever $67^b$ and the connecting quadrants $70^b$—$70^b$ upon the shafts $68^b$—$68^b$. This action results in a movement of the plates $57^b$ toward each other, compressing the walls of the teat cup at the upper end upon the teat introduced therein and near the junction of the same with the udder. When the upper plates $57^b$—$57^b$ are thus forced against the teat, the piston $79^b$ by which the upper pair of plates are operated, rises on the crown of the cam $74^b$, which is for the rest of the distance radially equal. With the upper plates thus held in position, the second cam $75^b$ operates upon the second piston $79^b$ to force the second plates $57^b$, $57^b$ to close upon the teat in the section immediately below the first mentioned plates. When the second piston $79^b$ rises to the crown of the cam $75^b$, the first and second pairs of plates are held stationary, while the rise of the third cam $76^b$ impinges upon the bullet end of the succeeding piston $79^b$, to compress the third series of plates $57^b$. The operation of the fourth and last cam $77^b$, is similar to the action described with reference to the foregoing cams, resulting in the compression of the last pair of plates $57^b$, $57^b$ upon the lower end of the teat. In this operation it will be observed that the levers $83^b$ are pivoted on the heads $88^b$ against the compression of the springs $90^b$—$90^b$. When it is desired to relieve the pressure on the plates $57^b$—$57^b$, this may be readily accomplished, relieving the tension on the springs $90^b$—$90^b$ by rotating the screw $93^b$ by the heads $94^b$. The result in the variation in the tension on the springs $90^b$—$90^b$ is to effect a variation in the compression of the plates $57^b$—$57^b$ upon the imprisoned teat. When in the operation of the cams on the shaft $78^b$ the pistons $79^b$ are retracted, and the desired pressure on the plates $77^b$—$77^b$ is reached, the further action of the piston $79^b$ operates to swing the lever $83^b$ on the pivot $86^b$ to compress the springs $90^b$—$90^b$. It will be understood that this adjustment can be quickly and readily effected by means of the thumb screw $69^b$. The operator, when placing the teat cups on the udder, may observe any restlessness on the part of the animal, indicating too great a severity in the action of the mechanism, and may relieve the same by releasing the tension on the springs $90^b$—$90^b$.

To maintain the parallel movement of the plates $57^b$—$57^b$, these plates are provided with extensions $96^b$, to which are pivoted arms $97^b$, which are pivoted to the frame $69^b$ at $98^b$. The pivots $99^b$ and $98^b$ being fixed, and the pivots $65^b$ and $68^b$ being also fixed and equal, the plates are held in parallel relation as they are caused to project toward or recede from each other.

The teat cup $50^b$ is mounted within a suitable light metal casing $100^b$, which is shaped as shown in the drawings, and more particularly in Figs. 7 and 10 thereof. It will be understood that the teat cups are not connected with the casing $100^b$ but are connected with and hung upon the upper and lower plates $57^b$, but are protected by the casing $100^b$ from external damage or injury.

As stated, the teat cups with their operating mechanism such as just above described, are constructed to operate upon single teats. They are mounted in a supporting frame so that the teat cups or casings $100^b$ abut on the operating mechanism connected with the cam shaft $78^b$, being extended outward from the center of the supporting frame.

Each teat cup is provided with a T-slide rail $101^b$, which is extended horizontally across the outer wall of a supporting plate $104^b$. The rail $101^b$ is inserted within and supported by a channel arm $102^b$ which is extended from vertical supports $103^b$. The plate $104^b$ is provided with bracket extensions $105^b$, the upper one of which is pivotally connected with the cam shaft $78^b$ where the same extends through the casing $69^b$. The lower extension $105^b$ supports a casing $106^b$ which receives the lower end of the shaft $78^b$. The plate $104^b$ is further provided with extensions $107^b$ and $108^b$ which support an ear connected to a guide rod $109^b$, which operates in a slidable collar $110^b$ when the said cups are reciprocated to rise and fall against and from the udder. In this reciprocation they are compelled by the supporting levers $36^a$ and their companion link arms $39^a$.

The collars $110^b$ are mounted on the ends of arms $111^b$ $111^b$ which are guided in a casing $112^b$. At the inner extension of the arms $111^b$—$111^b$ they are provided with rack toothed sections $113^b$, which are opposed each to the other and held in toothed engagement with a small pinion $114^b$. The casing $112^b$ is integrally formed upon a dividing plate $115^b$. The plate $115^b$ is adapted to slide up and down in a channel formed between the uprights $103^b$, which are slidably connected together. The plate $115^b$, sliding in the channel or groove between the uprights $103^b$, serves to keep the casing $112^b$ in a horizontal position and to keep the teat cups equi-distant from the center. The pinion $114^b$ is fixedly mounted upon a small shaft $116^b$, extended through the casing $112^b$ and provided with a wing nut $117^b$. The wing nut $117^b$ is provided with a spring-actuated detent $118^b$, having a tooth to strike within and engage the teeth of a toothed detent plate $119^b$. When the pinion $114^b$ is rotated by turning the wing nut $117^b$, the arms $111^b$—$111^b$ and collars $110^b$—$110^b$ are extended or contracted, according to the operation of the said pinion $114^b$.

It will be understood that there is such a mechanism as just described at both ends of the milking apparatus; it is thereby possible to extend the teat cups at one end while contracting them at the other, for adjustment as desired, by reason of the fact that in cows the location of the teats is irregular, and this lateral adjustment of the forward and rear pairs of cups is necessary to a perfect operation.

The teat cups are held in their parallel arrangement longitudinally, by means of tubes on the cam box $120^b$—$120^b$, which are alined and joined by a rod $121^b$, telescopically mounted within the said tubes, which maintains the parallel position of the said cups on the same side.

The cups in their pair arrangement are adjustable lengthwise of the apparatus by means of extension bars $122^b$—$122^b$, which are incased within the casing $123^b$, and at their end form the vertical supports $103^b$. The inner ends of the bars $122^b$—$122^b$ are provided with rack teeth $124^b$, between which is mounted a pinion $125^b$, the teeth of which engage the rack teeth $124^b$—$124^b$. This construction preserves the extension of each of the laterally-disposed bars from the longitudinal center where the pinion $125^b$ is located in the casing $123^b$. The pinion $125^b$ is provided with a short shaft $126^b$, which is mounted in the side of the casing 123$^b$. From the side of one of the supports 103$^b$ is extended a perforated ear 127$^b$. Extended on one side of the machine from the ear 127$^b$ is a single guide shaft or a rocking bar 128$^b$, provided with means 129$^b$ for operating the same and which is extended from the supporting member 103$^b$ at the near end and there provided with gear teeth 130$^b$, adapted to receive the teeth or serrations on one side of the bar 123$^b$.

In the operation of the longitudinally operating mechanism just described, the operator normally pulls one or both bars, particularly the bar 128$^b$, throwing the same so that the teeth or serrations 130$^b$, provided in the top thereof, are out of engagement with the teeth on the bar 123$^b$. When the proper expansion has been obtained the rod 128$^b$ is thrown to the locking position and the bars 122$^b$ become fixed. It will thus be seen that the four teat cups may be adjusted at will either laterally or longitudinally, and that the lateral adjustment in the various pairs may be independent for the reasons above given.

It has been described whereby the milking apparatus and operating mechanism for the teat cups and the said teat cups, are supported in operative position and maintained in vertical arrangement by means of the levers 36$^a$ and link arms 39$^a$, together with the supporting mechanism connected between the said levers and link arms and the back of the building structure. There now remains to be described the driving mechanism for carrying on the operation of milking.

The building structure is provided with a main driving shaft 150$^c$, which is extended parallel with the milking rack formed by the stanchions X X, and is provided with miter gears 151$^c$, which are held in tooth engagement with the mated miter gears 152$^c$. The gears 152$^c$ are fixedly mounted upon a vertical shaft 153$^c$, which is set in bearing brackets 154$^c$ and a bracket case 155$^c$, which are both fixed to the stanchion X. The shaft 153$^c$ is provided at the lower end with a pinion 156$^c$.

The shafts 150$^c$ and 153$^c$ and the miter gears and pinion just described are constantly in position. The pinion 156$^c$ is fixedly mounted upon the shaft 153$^c$, being secured thereto by a suitable device. The pinion 166$^c$ is provided with a suitable grooved collar adapted to receive a clutch yoke 158$^c$. The clutch yoke 158$^c$ is formed at the lower end of a sleeve 159$^c$, at the upper end of which is provided a pin 160$^c$, which is engaged by the yoke extension 161$^c$ of a hand lever 162$^c$. The hand lever 162$^c$ is pivotally mounted at 163$^c$ on the casing 4$^a$. Upon the casing 4$^a$ and connection 163$^c$ is formed a quadrant 164$^c$, having peripheral gear teeth, as shown in the drawings and particularly shown in Fig. 2 thereof. The teeth formed in the periphery of the quadrant are provided to receive the teeth of a spring-actuated detent 165$^c$.

By operating the hand lever 162$^c$ to raise and lower the sleeve 159$^c$, the pinion 166$^c$ is raised or lowered within the casing 4$^a$. In the lowered position, such as shown in Fig. 2 of the drawings, it is in position to engage the pinion 156$^c$ mounted in the casing 155$^c$. The pinion 166$^c$ is mounted on a shaft 167$^c$, rotatably mounted within the casing 4$^a$. Fixedly mounted upon the said shaft 167$^c$ is a miter gear 168$^c$, which is held in toothed engagement with a mated miter 169$^c$. The miter 169$^c$ is fixedly mounted upon a shaft 170$^c$ suitably mounted within the casing 4$^a$. This shaft is extended through and slidably secured to a sleeve 171$^c$, upon which are fixedly mounted pinions 172$^c$, 173$^c$ and 174$^c$. The sleeve 171$^c$ is suitably connected to a lever 175$^c$, the yoke end of which is joined by links 176$^c$ to the end of said sleeve. The lever 175$^c$ is suitably pivoted at 177$^c$ and is connected with a hand lever 178$^c$. The hand lever 178$^c$ carries a spring-actuated detent 179$^c$ constructed substantially as shown in Fig. 2 of the drawings, to engage a quadrant 180$^c$ rigidly formed on the arm 5$^a$.

The mechanism comprising the levers 175$^c$ and 178$^c$ and the pinions 172$^c$, 173$^c$ and 174$^c$ constitutes the speed changing mechanism. The gear 172$^c$ is adapted to mesh with the gear 181$^c$ only; the gear 173$^c$ is adapted to mesh with the gear 182$^c$ only; the gear 174$^c$ is adapted to mesh with the gear 183$^c$ only; and only two of the said gears are in position at the same time. This engagement of the gears is produced by throwing the lever 175$^c$ to move the sleeve 171$^c$ lengthwise of the casing 5$^a$.

The gears 181$^c$, 182$^c$ and 183$^c$ are fixedly mounted on a short shaft 184$^c$ which is suitably mounted in the casing 5$^a$. At the outer end of the shaft 184$^c$ there is connected pivotally or otherwise a flexible driving shaft 185$^c$. At the other end of the driving shaft 185$^c$ is connected fixedly a short crank shaft 186$^c$ mounted within the gear casing 35$^a$. (See Fig. 5 of the drawings).

Before proceeding to describe the operation of the driving mechanism operated from and controlled within the gear casing 35$^a$, I will describe how the power is transmitted to the shaft 185$^c$.

As explained, the shaft 153$^c$ is constantly operated. When, as above described the apparatus is attached to the milking rack X by dropping the tapered pin 2$^a$ within the socket formed in the block 1$^a$, the pinion 156$^c$ is placed into position where the pinion 166$^c$ will mesh with it when lowered by the hand lever 162$^c$. When this connection is made the rotary motion is transmitted from the shaft 153$^c$ through the gear pinions to the sleeve 171ᶜ and the pinions of various diameters mounted thereon. Through the one or other of said pinions by its engagement with the corresponding gear on the shaft 184ᶜ the said shaft 184ᶜ and the shaft 185ᶜ are rotated. In the early course of operation the gear 172ᶜ is in engagement with the gear 181ᶜ when the power is thrown on to the shaft carrying the sleeve 171ᶜ by depressing the pinion 166ᶜ. This provides for the introduction of the rotary power to the shaft 185ᶜ and mechanism connected therewith gradually. The motion may be accelerated by changing the gearing from 172ᶜ up to the gearing produced by the engagement of the pinion 172ᶜ with the small pinion 183ᶜ in which engagement the rotation produced in the shaft 185ᶜ is accelerated largely over and above that produced on the shaft 153ᶜ.

There are two crank shafts 186ᶜ—186ᶜ, the crank arms 187ᶜ of which are pivotally connected with pitmen 188ᶜ which are connected to riding blocks 189ᶜ. The riding blocks 189ᶜ are slidably mounted in plates 190ᶜ and are pivotally connected by crank pins 191ᶜ to rocking levers 192ᶜ. The rocking levers 192ᶜ are pivoted at 193ᶜ upon sliding blocks 194ᶜ, which are suitably grooved to receive the guide fins in the rocking levers 192ᶜ. The pivots 193ᶜ are set out from the side of a movable block 195ᶜ. The block 195ᶜ is perforated and threaded to receive a heavy screw 196ᶜ, which is rotatably mounted in a standard 197ᶜ set up from the floor of the casing 35ᵃ, and in a boss 198ᶜ extended from the side thereof. The screw 196ᶜ is rotatably mounted in the standard 197ᶜ and boss 198ᶜ, and is suitably collared to prevent longitudinal movement, and is provided at the end with a crank handle 199ᶜ by which the screw may be readily rotated.

The mechanism so far described with the exception of the screw 196ᶜ is duplicated in parallel disposition within the casing 35ᵃ. When the shafts 186ᶜ are connected by meshed pinions 200ᶜ, by reason of the engagement of the two pinions the rotary motion imparted by the flexible shaft 185ᶜ to the one shaft 186ᶜ is quickly transmitted to the other shaft 186ᶜ. The crank extensions of the two shafts are in opposite directions, but for purposes which will be more clearly set forth, the pinions 200ᶜ—200ᶜ are mounted loosely upon the shafts 186ᶜ—186ᶜ, being engaged by members formed on either the pinions or shafts optionally and adapted to engage at a half revolution.

It will be observed with the mechanism constructed and arranged as thus described, that the levers 192ᶜ—192ᶜ are rocked by the pitmen 188ᶜ and crank arms 187ᶜ in opposite directions. The outer ends of the levers 192ᶜ travel an arc of greater or less extent, according as the pivots 193ᶜ are moved toward or from the crank pins 191ᶜ. This movement is imparted by the screw 196ᶜ, which when turned by the handle 199ᶜ advances or recedes the block 195ᶜ moving the same back and forth in the slot provided in the levers 192ᶜ. To maintain the block 195ᶜ in a constant horizontal position, the pivots 193ᶜ are extended laterally to rest in grooves or guides 204ᶜ, provided in the side of the casing 35ᵃ. It will thus be seen that the extent of rise and fall of the outer ends of the levers 192ᶜ is graduated according to the position of the block 195ᶜ.

The free ends of the levers 192ᶜ are, by the links 201ᶜ connected with the short arms 202ᶜ which are mounted upon tubular shafts 203ᶜ. Fixedly attached to the shafts 203ᶜ are the supporting arms 36ᵃ—36ᵃ. As heretofore described, the suporting arms 36ᵃ—36ᵃ are connected at 38ᵃ with the supporting frame. By reason of this connection the teat cups and driving mechanism connected therewith are reciprocated in a vertical direction as the levers 192ᶜ—192ᶜ are rocked.

Fixedly mounted upon the shaft 186ᶜ is a miter gear 206ᶜ, which is mounted in toothed engagement with a miter gear 207ᶜ. The gear 207ᶜ is fixedly mounted upon a shaft 208ᶜ, vertically supported in bearings in the casing 35ᵃ. In the shaft 208ᶜ is a long groove 209ᶜ, which engages a projection 210ᶜ, from the miter gear fixedly located in a small gear casing 211ᶜ. Extended from the side of the gear casing 211ᶜ is a boss 212ᶜ, which forms the bearing for a shaft 213ᶜ. On the end of the shaft 213ᶜ is mounted a miter gear 214ᶜ, held in toothed engagement with the miter 210ᶜ, which is pivoted to slide on the shaft 208ᶜ. The casing 211ᶜ is perforated to pass the shaft 208ᶜ, and is intended to slide up and down, the same as the teat cups to which the respective shafts 213ᶜ—213ᶜ are connected and raised and lowered by the levers 38ᵃ—38ᵃ. Extended from the bosses 212ᶜ are supporting rods 215ᶜ—215ᶜ, which are maintained by the supporting frames for the teat cups in parallel arrangement. The shafts 213ᶜ—213ᶜ are operated constantly and at the same rate of speed. They are provided with spiral gears 216ᶜ, slidably mounted upon the front of the said shaft and engaged with a spiral gear 217ᶜ. The spiral gear 217ᶜ is mounted upon a shaft 218ᶜ, which is telescopically mounted in a tubular shaft 221ᶜ, on which is mounted a straight gear 219ᶜ, to mesh with a straight gear 220ᶜ. The gear 220ᶜ is mounted upon a short shaft E, at the end of which is a miter gear 222ᶜ. The miter gear 222ᶜ is held in meshed engagement with a miter gear 223ᶜ. The gear 223ᶜ is fixedly mounted upon the cam shaft 78ᵇ. The shaft 213ᶜ is held in bearings in a small gear case 224ᶜ, which is fixedly attached to the supports 103ᵇ. The telescopic shafts E and 218ᶜ allow the teat cups to be laterally adjusted. On the two forward teat cups shown in Figs. 11 and 12, the gears 216ᶜ are carried on a tubular shaft F which, by means of a spline and groove, is slidable lengthwise of the shaft 213ᶜ. On the two rear teat cups, the gears 216ᶜ are carried on a section of the shaft 213ᶜ, which telescopes in a tube 225ᶜ. This arrangement of the driving gears interposed between the shaft 213ᶜ and the cam shaft 78ᵇ permits each of the teat cups and operating mechanism connected therewith to pivot on the shafts 78ᵇ to tilt the said cups toward and away from each other, and permits also of a certain amount of independent disalinement of the shaft 213ᶜ with the said driving mechanism of the said teat cups. The shaft 213ᶜ is spliced or formed telescopically with a tube 225ᶜ. This extension mechanism permits the longitudinal adjustment of the rear teat cups heretofore mentioned.

It will be understood that wherein this driving mechanism has been referred to in the singular form, the plural is to be understood, for the reason that there are two shafts 213ᶜ and two operating mechanisms connected with each of the shafts 78ᵇ, of which there are four, one for each of the teat cups.

With an apparatus constructed as herein described, and as shown in the accompanying drawings, the operation is as follows:— The cow having been secured in the milking rack, the operator places the pin 2ᵃ in the socket provided in the block 1ᵃ. The supporting arms are thrown to the position needed to introduce the teat cups 50ᵇ—50ᵇ below the udder. The operator depresses the supporting arms against the pull of the spring 32ᵃ until the teat cups are below the lower end of the teats. The teats are introduced into the teat cups and the cups are adjusted with the natural position of the teats by operating the wing nuts 117ᵇ and 129ᵇ, adjusting the said teat cups laterally and longitudinally, respectively. When thus adjusted the spring 32ᵃ is permitted to raise the supporting frame to lift the cups firmly against the udder. In introducing the cups to the teats the plates 57ᵇ—57ᵇ should be retracted. This requires that the driving mechanism for one pair of the cups should be advanced or receded one-half turn of the driving shaft. This is the reason for the loose mounting of the pinions 200ᶜ—200ᶜ, this mounting permitting the rotation of the driving mechanism for the one-half revolution of the shaft 186ᶜ. When the driving mechanism is started this will immediately pick up the disadjustment and from thence on operate in the alternate manner herein described. In placing the teat cups in position the rod 22ᵃ is introduced between the brisket and fore legs of the animal. If it is necessary to place a surcingle upon the animal this is accomplished as hereinbefore described. The milking mechanism being now in position to start, the operator grasps the hand lever 162ᶜ and lowers the pinion 166ᶜ into engagement with the pinion 156ᶜ. With the engagement of these two pinions the flexible shaft 185ᶜ and the operating mechanism connected therewith in the gear case 35ᵃ, is started. If now the operator finds that the compression is too severe upon the teats of the animal, this can be regulated by releasing the tension by rotating the thumb nuts 94ᵇ—94ᵇ connected with the various cups, thereby reducing the pressure on the spiral springs 90ᵇ.

The mechanism so described is constructed and timed with reference to the compression action of the plates 57ᵇ, so that as the teats are grasped by the four pairs of plates 57ᵇ the arm 36ᵃ on the side holding the grasping cups is restricted to a downward position operating to produce a pull upon the teats. At the same instant the arm 36ᵃ on the opposite side, with the plates 57ᵇ—57ᵇ being expanded, is raised upward against the udder, the inner side or top of the cups extending well into the crease between the teats. At the instant of the release of the teats by the expansion of the plates 57ᵇ—57ᵇ on the depressed arm 36ᵃ, the upper pair of the plates 57ᵇ—57ᵇ close upon the teats which they surround, and it will be noticed that this closure is upon the juncture of the teat with the udder. The compression now proceeds upon this side of the udder and the arm 36ᵃ is gradually drawn down so that the teats are pulled into position, practically as shown at Fig. 24 of the drawings. These actions are in more or less exact similitude to the action of the human hand.

When now the udder is becoming exhausted and the flow of the milk retarded, this may be accelerated by rotating the handle 199ᶜ to advance the block 195ᶜ to increase the length of the action of the levers 192ᶜ and with them the length of the stroke of the levers 36ᵃ. The immediate result of this action will be that the cups are forced farther upward on rising against the udder, striking the same with a soft impact. At the same time, in the downward stroke the teat is elongated, pulling the cells of the udder into a more contracted position, the result of the two actions being that the lacteal cells are manipulated into activity. As the milk is drawn into the cups 50ᵇ, it is led away by the tubular extension 58ᵇ to the tube 61ᵇ and receptacle 62ᵇ. When the milk has been completely taken from one cow, the operator depresses the milking mechanism until the teats are freed from the cups 50ᵇ—50ᵇ. The operating mechanism is swung so as to draw the rod 22ᵃ from between the brisket and fore legs of the animal, and the supporting mechanism is relieved from engagement with the socket in the block 1ª and is carried by the operator to the next cow to be milked. The operation is there repeated. This operation is repeated on successive cows until the complete milking is finished.

In some instances the shape of the udder and the hang of the teats are such that it requires that the cups be inclined to the udder. This adjustment is made by the screw 42ª which is rotatably mounted in the arm 43ª extended from the gear casing 35ª. The screw is rotatably mounted in the block 44ª, which is pivoted in the arm 43ª to rock therein. A similar block is mounted in the arm 45ª, which is an extension of the frame 34ª. By rotating the screw 42ª by means of the handle 46ª, the inclination of the casing 35ª is changed. A slight change of the gear casing produces a decided change in the position of the teat cups and in the manner in which they are presented to the udder.

When the cups are being placed upon the teats as above mentioned, and in order to do so it becomes necessary to open the one pair of cups, this is accomplished by turning the shaft 208ᶜ to which the shaft 213ᶜ is connected. It is for the purpose of turning this shaft that I have provided a thumb nut 226ᶜ.

Having thus described my invention, what I claim as new and desire to secure by Letters Patent is:—

1. A mechanical milker, comprising a supporting frame for the milking mechanism adapted to be adjustably attached to the building structure at stations provided, an arm extended from said frame adapted to extend between the fore legs and brisket of the animal and having a spring to press the said arm upward against the body of the animal, a teat manipulating mechanism supported by said frame, a driving mechanism permanently mounted on the structure, and a transmission mechanism mounted on said supporting frame adapted to connect said driving mechanism and teat manipulating mechanism.

2. A mechanical milker, comprising a supporting frame embodying a plurality of arms hingedly connected and provided with a spring to raise the outer end of the said arms, an arm extended from said frame adapted to extend between the fore legs and brisket of the animal, a teat manipulating mechanism supported by said frame, a driving mechanism permanently mounted on the structure, and a transmission mechanism mounted on said supporting frame adapted to connect said driving mechanism and teat manipulating mechanism.

3. A mechanical milker, comprising a supporting frame embodying a plurality of arms hingedly connected and having a spring member to raise the same at the outer end thereof, adjustable tension devices to vary the tension of said spring member, a teat manipulating mechanism supported by said frame, a driving mechanism permanently mounted on the structure, and a transmission mechanism mounted on said supporting frame adapted to connect said driving mechanism and teat manipulating mechanism.

4. A mechanical milker, comprising a supporting frame for the milking mechanism, embodying a plurality of arms hingedly connected and having a spring member to raise the outer end thereof, an arm extended from said frame adapted to extend between the fore legs and brisket of the animal, a teat manipulating mechanism supported by said frame, a driving mechanism adapted to reciprocate said supporting mechanism vertically at the end carrying said manipulating mechanism, and a transmission mechanism mounted on said supporting frame adapted to connect the said driving mechanism and said teat and reciprocating mechanisms.

5. A mechanical milker, comprising a supporting frame for the milking mechanism adapted to be attached to the building structure at stations provided, a holding member attached to said frame and adapted to engage the body of the animal in guided relation thereto, a teat manipulating mechanism operating to compress the teats mechanically, an operating mechanism adapted to reciprocate the said supporting frame vertically at the end carrying said manipulating mechanism, a driving mechanism permanently mounted on the structure, and a transmission mechanism mounted on said supporting frame adapted to connect said driving mechanism and teat and reciprocating mechanisms.

6. A mechanical milker, comprising a supporting frame and milking mechanism adapted to be adjustably attached to the building structure at stations provided, a holding member attached to said frame and adapted to engage the body of the animal in guided relation thereto, a teat manipulating mechanism operating to compress the teats progressively from the top downward, a driving mechanism permanently mounted on the structure, and a transmission mechanism mounted on said supporting frame adapted to connect said driving mechanism and teat manipulating mechanism.

7. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats progressively from the top downward, an operating mechanism adapted to reciprocate said supporting frame vertically at the end carrying said manipulating mechanism, and a driving mechanism embodying a transmission mechanism mounted on said supporting frame and adapted to connect said driving mechanism and teat manipulating and reciprocating mechanisms.

8. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats progressively from the top downward, an operating mechanism to reciprocate the parts of said supporting frame alternately on opposite sides of the udder, and a driving mechanism embodying a transmission mechanism mounted on said supporting frame adapted to connect said driving mechanism and said teat and reciprocating mechanisms.

9. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats progressively from the top downward, an operating mechanism to reciprocate the parts of said supporting frame alternately on opposite sides of the udder and in harmony with said teat manipulating mechanism, to depress the same when the members are compressed and to raise the same when the members are opened, and a driving mechanism embodying a transmission mechanism adapted to connect said driving mechanism and teat manipulating and operating mechanisms.

10. A mechanical milker, comprising a supporting frame for the milking mechanism, embodying a plurality of arms hingedly connected and having a spring to raise the same at the outer end thereof, a holding member attached to said frame adapted to engage the body of the animal in guided relation thereto, a teat manipulating mechanism operating to compress the teats mechanically, means for adjusting the members of said mechanism to the physical frame of the animal, an operating mechanism adapted to reciprocate the said supporting frame vertically at the end carrying said manipulating mechanism, and a driving mechanism embodying a transmission mechanism mounted on said supporting frame and adapted to connect said driving mechanism and teat manipulating and operating mechanisms.

11. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices adapted to operate each teat separately to extract the milk therefrom, and a driving mechanism embodying a transmission mechanism mounted on said frame adapted to connect said driving mechanism and teat manipulating mechanism.

12. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices adapted to operate each teat separately to extract the milk therefrom, an operating mechanism adapted to reciprocate said supporting frame vertically at the outer end carrying said teat manipulating mechanism, and a driving mechanism embodying a transmission mechanism mounted on said supporting frame adapted to connect the said driving mechanism and teat and reciprocating mechanisms.

13. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices adapted to operate each teat separately to extract the milk therefrom, an operating mechanism to reciprocate the said supporting frame alternately on opposite sides of the udder, and a driving mechanism embodying a transmission mechanism mounted on said supporting frame adapted to connect said driving mechanism and teat and reciprocating mechanisms.

14. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices operating to compress each teat separately and progressively from the top to the bottom thereof, and a driving mechanism embodying a transmission mechanism mounted on said supporting frame adapted to connect said driving mechanism and teat manipulating mechanism.

15. A mechanical milker, comprising a supporting frame for the milking mechanism, embodying a plurality of arms hingedly connected and having a spring to raise the outer end thereof, a holding member attached to said frame adapted to engage the body of the animal in guided relation thereto, a teat manipulating mechanism embodying a plurality of devices operating to compress each teat separately and progressively from the top to the bottom, an operating mechanism adapted to reciprocate said supporting frame vertically at the end carrying said manipulating mechanism, and a driving mechanism embodying a transmission mechanism adapted to connect said driving mechanism and said teat manipulating and reciprocating mechanisms.

16. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices operating to compress each teat separately and progressively from the top to the bottom, an operating mechanism to reciprocate the said supporting frame on opposite sides of the udder, and a driving mechanism embodying a transmission mechanism adapted to connect said driving mechanism and teat manipulating and reciprocating mechanisms.

17. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats mechanically, an operating mechanism adapted to reciprocate said supporting frame vertically at the end carrying the said manipulating mechanism, means for varying the extent of the said reciprocation, and a driving mechanism embodying a transmission mechanism mounted on said supporting frame adapted to connect the said driving mechanism and teat manipulating and reciprocating mechanisms.

18. A mechanical milker, comprising a supporting frame for the milking mechanism, embodying a plurality of arms hingedly connected and having a spring to raise the outer end thereof, a holding member attached to said frame adapted to engage the body of the animal in guided relation thereto, a teat manipulating mechanism embodying a plurality of devices operating to compress each teat separately and progressively from the top to the bottom, an operating mechanism adapted to reciprocate the said supporting frame alternately on opposite sides of the udder and in harmony with said manipulating mechanism, to depress same when the members are compressed and to raise same when the members are opened, and a driving mechanism embodying a transmission mechanism mounted on said supporting frame adapted to connect said driving mechanism and teat manipulating and reciprocating mechanisms.

19. A mechanical milker, comprising a supporting frame for the milking mechanism, embodying a plurality of arms hingedly connected and having a spring to raise the outer end thereof, a holding member attached to said frame adapted to engage the body of the animal in guided relation thereto, a teat manipulating mechanism embodying a plurality of devices adapted to operate each teat separately to extract the milk therefrom, an operating mechanism to reciprocate the said supporting mechanism alternately on opposite sides of the udder and in harmony, to depress the same when the members are compressed and to raise the same when the members are opened, means for varying the extent of the reciprocation, and a driving mechanism embodying a transmission mechanism mounted on said supporting frame adapted to connect said driving mechanism and teat manipulating and reciprocating mechanisms.

20. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices operating to compress each teat separately and progressively from the top to the bottom, an operating mechanism to reciprocate the said supporting frame alternately on opposite sides of the udder, and in harmony with said manipulating mechanism, to depress the same when the compression members are compressed and to raise the same when the said members are opened, means for varying the extent of the reciprocation, and a driving mechanism embodying a transmission mechanism mounted on said supporting frame and adapted to connect said driving mechanism and teat manipulating and reciprocating mechanisms.

21. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats mechanically, means for adjusting the members of said manipulating mechanism to the physical form of the animal, an operating mechanism adapted to reciprocate the said supporting frame vertically at the end carrying the said manipulating mechanism, means for varying the extent of the reciprocation, and a driving mechanism embodying a transmission mechanism mounted on said supporting frame adapted to connect said driving mechanism and teat manipulating and reciprocating mechanisms.

22. A mechanical milker, comprising a supporting frame for the milking mechanism, embodying a plurality of arms hingedly connected and having a spring to raise the outer end thereof, a holding member attached to said frame adapted to engage the body of the animal in guided relation thereto, a teat manipulating mechanism operating to compress the teats mechanically, means for varying the pressure on the teats, an operating mechanism adapted to reciprocate said supporting frame vertically at the end carrying the said manipulating mechanism, and a driving mechanism embodying a transmission mechanism mounted on said supporting frame adapted to connect said driving mechanism and teat manipulating and reciprocating mechanisms.

23. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats progressively from the top downward, means for varying the pressure on the teats, an operating mechanism adapted to reciprocate said supporting frame vertically at the end carrying the said manipulating mechanism, and a driving mechanism embodying a transmission mechanism mounted on said supporting frame and adapted to connect said driving mechanism and teat manipulating and reciprocating mechanisms.

24. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism operating to compress the teats progressively from the top downward, an operating mechanism adapted to reciprocate the parts of said supporting mechanism alternately on opposite sides of the udder, means for varying the pressure on the teats, and a driving mechanism embodying a transmission mechanism mounted on said supporting frame adapted to connect said driving mechanism and teat manipulating and reciprocating mechanisms.

25. A mechanical milker, comprising a supporting frame for the milking mechanism, embodying a plurality of arms hingedly connected and having a spring to raise the outer end thereof, a holding member attached to said frame adapted to engage the body of the animal in guided relation thereto, a teat manipulating mechanism operating to compress the teats progressively from the top downward, means for varying the pressure on the teats, an operating mechanism to reciprocate the said supporting mechanism alternately on opposite sides of the udder and in harmony with said manipulating mechanism, to depress the same when the members are compressed and to raise the same when the members are opened, and a driving mechanism embodying a transmission mechanism on said supporting frame adapted to connect said driving mechanism and teat manipulating and reciprocating mechanisms.

26. A mechanical milker, comprising a supporting frame for the milking mechanism, embodying a plurality of arms hingedly connected and having a spring to raise the outer end thereof, a holding member attached to said frame adapted to engage the body of the animal in guided relation thereto, a teat manipulating mechanism operating to compress the teats mechanically, means for adjusting the members of said manipulating mechanism to the physical form of the animal, means for varying the pressure on the teats, an operating mechanism adapted to reciprocate the said supporting frame vertically at the end carrying the said manipulating mechanism, and a driving mechanism embodying a transmission mechanism mounted on said supporting frame and adapted to connect the said driving mechanism and teat manipulating and reciprocating mechanisms.

27. A mechanical milker, comprising a supporting frame for the milking mechanism, a holding member attached to said frame and adapted to engage the body of the animal in guided relation thereto, a teat manipulating mechanism embodying a plurality of devices adapted to operate each teat separately to extract the milk therefrom, means for varying the pressure on the teats, and a driving mechanism embodying a transmission mechanism mounted on said supporting frame and adapted to connect the said driving mechanism and teat manipulating mechanism.

28. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism, embodying a plurality of devices operating to compress each teat separately and progressively from the top to the bottom, means for varying the pressure on the teats, and a driving mechanism mounted on said supporting frame and adapted to connect the said driving mechanism and teat manipulating mechanism.

29. A mechanical milker, comprising a supporting frame for the milking mechanism, embodying a plurality of arms hingedly connected and having a spring to raise the outer end thereof, a holding member attached to said frame and adapted to engage the body of the animal in guided relation thereto, a teat manipulating mechanism embodying a plurality of devices operating to compress each teat separately and progressively from the top to the bottom, an operating mechanism adapted to reciprocate the said supporting frame vertically at the end carrying the said manipulating mechanism, means for varying the pressure on the teats, and a driving mechanism embodying a transmission mechanism mounted on said supporting frame adapted to connect said driving mechanism and said teat manipulating and reciprocating mechanisms.

30. A mechanical milker, comprising a supporting frame for the milking mechanism, embodying a plurality of arms hingedly connected and having a spring to raise the outer end thereof, a holding member adapted to engage the body of the animal in guided relation thereto, a teat manipulating mechanism embodying a plurality of devices operating to compress each teat separately and progressively from the top to the bottom, an operating mechanism to reciprocate the said supporting mechanism alternately on opposite sides of the udder and in harmony with the said manipulating mechanism, to depress the same when the members of the said manipulating mechanism are compressed and to raise the same when the said members are opened, means for varying the pressure on the teats, and a driving mechanism embodying a transmission mechanism mounted on said supporting frame and adapted to connect the said driving mechanism and teat manipulating and reciprocating mechanisms.

31. A mechanical milker, having a suitable driving mechanism and comprising a plurality of flexible cups adapted to enfold the teats, a plurality of compression members arranged in pairs the members whereof are adapted to be closed upon each other, a suitable operating mechanism embodying a plurality of cams mounted on the same shaft and having dissimilar lengths and similar falls, said falls being in line, said cams operating to close the said members progressively from the top to the bottom, and yielding members interposed between said cams and said compression members.

32. A mechanical milker, having a suitable driving mechanism and comprising a plurality of flexible cups adapted to enfold the teats, a plurality of elongated plates arranged in pairs the members whereof are adapted to be closed upon each other, a plurality of cams mounted on the said shaft and having dissimilar lengths and similar falls, said falls being in line, said cams being adapted to close the said plates upon each other progressively from the junction of the teats with the udder, and yielding members interposed between said cams and said plates.

33. A mechanical milker, having a suitable driving mechanism and comprising a plurality of flexible cups adapted to enfold the teats, a plurality of elongated plates arranged in pairs the members whereof are adapted to be closed upon each other, a plurality of cams mounted upon the same shaft and having dissimilar lengths and similar falls, the said falls being in line, yielding members to transmit the action from said cams to said plates, and means for varying the strength of the said yielding members.

34. A mechanical milker, having a teat manipulating mechanism, a suitable driving mechanism adapted to operate said teat manipulating mechanism, a supporting arm for said teat manipulating mechanism, a mechanism for reciprocating said arm, means for varying the reciprocation embodying a rocking lever the ends whereof are connected to the said driving mechanism and said arms, a shiftable fulcrum for said rocking lever, and means for shifting said fulcrum.

35. A mechanical milker, having a teat manipulating mechanism, a suitable driving mechanism adapted to operate said teat manipulating mechanism, a supporting arm for said teat manipulating mechanism, a reciprocating mechanism for said arm embodying a rocking lever the ends whereof are connected to the said driving mechanism and said arm, a shiftable fulcrum for said rocking lever, and a screw threaded member having an extended handle adapted to shift said fulcrum.

36. A mechanical milker, having a suitable driving mechanism and comprising a plurality of flexible cups adapted to enfold the teats, a plurality of compression members arranged in pairs the members whereof are adapted to be closed upon each other, a suitable operating mechanism connected with said driving mechanism adapted to close the said compression members, a plurality of supporting arms for said cups and compression members thereof, a mechanism for reciprocating said arms embodying a plurality of rocking levers the ends whereof are connected to the said driving mechanism and said arms, a shiftable fulcrum for said rocking levers, and a screw threaded member having an extended handle adapted to shift the said fulcrum to vary the reciprocation of said arms.

37. A mechanical milker, having a suitable driving mechanism and comprising a plurality of flexible cups adapted to enfold the teats, a plurality of compression members arranged in pairs upon each cup, the members whereof are adapted to be closed upon each other, a suitable operating mechanism for said compression members adapted to close the said compression members progressively from the junction of the teats with the udder downward, a plurality of supporting arms for said flexible cups and operating mechanism connected therewith, a mechanism for reciprocating said arms embodying a plurality of rocking levers the ends whereof are connected to the said driving mechanism and said arms, a movable fulcrum for said rocking levers, and a screw threaded member having an extended arm adapted to shift the said fulcrums to vary the reciprocation of the said arms.

38. A mechanical milker, having a suitable driving mechanism and comprising a plurality of flexible cups adapted to enfold the teats, a plurality of compression members arranged in pairs the members whereof are adapted to be closed upon each other, a suitable operating mechanism connected with said driving mechanism adapted to close the said compression members progressively from the junction of the teats with the udder downward and embodying a plurality of yielding levers adapted to regulate the pressure exerted upon the teats, a plurality of supporting arms for said flexible cups and supporting mechanism connected therewith, a mechanism for reciprocating the said arms embodying a plurality of rocking levers the ends whereof are connected to the said driving mechanism and said arms, movable fulcrums for said rocking levers, and a screw threaded member having an extended handle adapted to shift said fulcrums.

39. A mechanical milker, having suitable driving mechanisms and comprising a plurality of flexible cups adapted to enfold the teats, a plurality of compression members arranged in pairs the members whereof are adapted to be closed upon each other, a suitable operating mechanism connected with said driving mechanism and embodying a plurality of cams mounted on the same shaft and having dissimilar lengths and similar falls, said falls being in line, yielding members to transmit the action from said cams to said compression members, a plurality of supporting arms for said teat mechanism, a mechanism for reciprocating the said arms embodying a plurality of rocking levers the ends whereof are connected to the said driving mechanism and said arms, movable fulcrums for said rocking levers, and a screw-threaded member having an extended handle adapted to shift the said fulcrum.

40. A mechanical milker, comprising a teat cup constructed from flexible waterproof material and provided with a perforated overhanging upper edge, said cup being converged at the lower end to form a delivery pipe, extended tab-like members attached to the sides of said cup, a support for said cup having upturned pins to fit within the perforations in the upper edge of said cup and provided with an expansible holding device to engage said tab-like members to extend the cup structure.

41. A mechanical milker, comprising a teat cup having an upper opening substantially square in form, the two sides whereof are raised and provided with thickened overhanging portions, the remaining sides being depressed at the center to permit of lateral compression of the said cup, a delivery pipe integrally formed on the bottom of said cup, a supporting flange for said cup embodying a plurality of compression members arranged in pairs, the upper member having extended pins to fit within the perforations in said overhanging edge, side pins extended from the lower pair of said members, tabs extended from the sides of said cup to slidably engage the last-mentioned pins, and expansion springs secured on the lower of said compression members and disposed to extend the said tabs downward to hold the said cup in extended position.

In testimony whereof I have signed my name to this specification in the presence of two subscribing witnesses.

LEONARD LEACH STORY.

Witnesses:
  I. T. BEEMAN,
  L. L. C. BEST.